(12) United States Patent
Bernick et al.

(10) Patent No.: US 7,764,689 B2
(45) Date of Patent: *Jul. 27, 2010

(54) METHOD AND APPARATUS FOR ARBITRATING DATA PACKETS IN A NETWORK SYSTEM

(75) Inventors: David L. Bernick, Ben Lomond, CA (US); Robert L. Jardine, Cupertino, CA (US); Marcelo M. de Azevedo, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1007 days.

This patent is subject to a terminal disclaimer.

(21) Appl. No.: 11/229,109

(22) Filed: Sep. 16, 2005

(65) Prior Publication Data

US 2007/0064699 A1 Mar. 22, 2007

(51) Int. Cl.
*H04L 12/28* (2006.01)
(52) U.S. Cl. .................................. 370/392; 370/401
(58) Field of Classification Search ................ 370/351, 370/389, 392, 400, 401
See application file for complete search history.

(56) References Cited

U.S. PATENT DOCUMENTS

| | | | |
|---|---|---|---|
| 5,546,391 A * | 8/1996 | Hochschild et al. ......... 370/413 |
| 5,751,932 A | 5/1998 | Horst et al. | |
| 6,128,296 A * | 10/2000 | Daruwalla et al. .......... 370/389 |
| 6,304,552 B1 | 10/2001 | Chapman et al. | |
| 6,941,308 B1 * | 9/2005 | Chilton ...................... 707/100 |
| 7,020,131 B1 * | 3/2006 | Yun et al. ................... 370/355 |
| 7,200,137 B2 * | 4/2007 | Dorr et al. .................. 370/351 |
| 7,277,399 B1 * | 10/2007 | Hughes, Jr. ................. 370/252 |
| 2001/0014089 A1 * | 8/2001 | Okajima et al. ............. 370/338 |
| 2002/0075870 A1 | 6/2002 | Azevedo et al. | |
| 2002/0154649 A1 | 10/2002 | Takase et al. | |
| 2003/0174691 A1 * | 9/2003 | Muhonen et al. ............ 370/351 |
| 2003/0179774 A1 | 9/2003 | Saidi et al. | |
| 2004/0081093 A1 * | 4/2004 | Haddock et al. ............ 370/230 |
| 2004/0085964 A1 * | 5/2004 | Vaananen ................ 370/395.4 |
| 2004/0141506 A1 | 7/2004 | Kim | |
| 2005/0147034 A1 * | 7/2005 | Zhao et al. .................. 370/229 |

OTHER PUBLICATIONS

United States Department of Commerce, Office Action Summary, Jun. 17, 2009, 37 pages.
United States Department of Commerce, Office Action Summary, Nov. 27, 2009, 38 pages.

* cited by examiner

*Primary Examiner*—Hong Cho

(57) ABSTRACT

Techniques for routing data packets in a networked system. Specifically, a network system and methods of arbitrating data packets in a network system are provided. Switching devices are configured to receive one or more data packets, wherein each of the one or more data packets includes a respective source identification. The source identifications are compared to a source identification history mechanism, and the routing order of the data packets is determined based on the comparison.

30 Claims, 12 Drawing Sheets

| Destination ID (DID) | Source ID (SID) | Control | Quality of Service (QOS) | Remote Memory Address (optional) | Packet Data Payload (optional) | Cyclic Redundancy Check (CRC) |

METHOD AND APPARATUS FOR ARBITRATING DATA PACKETS IN A NETWORK SYSTEM

CROSS-REFERENCE TO RELATED APPLICATIONS

The following commonly owned applications and patents are hereby incorporated by reference for all purposes:

U.S. patent application Ser. No. 11/228,657, filed concurrently herewith entitled "Globally Fair Polling for Packet Switched Routers Using Dynamically Biased Arbitration," By David L. Bernick et al.

BACKGROUND OF THE INVENTION

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Computer systems may be linked together to form a computer network such as a Local-Area Network (LAN) or a Wide-Area Network (WAN), for example. Computer networks are generally arranged having a particular "topology" which is used to characterize the geometric arrangement of the computer network. Local-Area Networks may be arranged in accordance with a bus topology, a ring topology, a star topology or a tree topology, for example. Computer networks may also be classified by architecture (e.g., peer-to-peer or client/server) and may be further characterized by a protocol that defines a common set of rules and signals that computers on the network use to communicate.

Each network generally includes one or more servers that are configured to manage and allocate network resources. File servers, print servers, network servers and database servers, for example, are generally dedicated to performing pre-defined tasks for each of the computer systems on the network. While computer networks and servers provide increased flexibility and accessibility, it is often desirable to link a number of computer networks together.

Generally, advanced interconnect technology, such as Hewlett Packard ServerNet interconnect technology, provides a mechanism for grouping a number of servers and associated computer networks together to provide an interconnected system of computer networks. Generally, ServerNet technology provides a fast, high-bandwidth, low-latency, highly scalable architecture to enable the interconnection and use of multiple servers having multiple computer system connections and resources. As described further below, switching fabrics, which may include devices such as routers or switches, are generally implemented to transfer data packets through a network. As will be appreciated, data packets generally refer to separately routable portions of a message. If the message is sufficiently short, the entire message may be included in a single data packet. A router generally provides a gateway between two or more networks. Accordingly, transferring data packets from a computer system on one network to a computer system on another network may be achieved through a router.

A router provides a mechanism to allow multiple output ports to be shared by multiple input ports. Typically, router ports are bi-directional and full-duplex. Consequently, they can behave both as an input port and as an output port at the same time depending on the direction of packet flow. Although a router port is often implemented with distinct circuitry to handle incoming and outgoing packets, some circuitry may be shared between the packet sending and receiving flow logic. As used herein the term "input port" refers to a port that receives an incoming packet, and the term "output port" refers to a port that sends an outgoing packet. It should be noted however that concurrent packet traffic on the router ports will often cause a particular port to simultaneously behave as an input port (with respect to packets that are received at that port) and as an output port (with respect to packets that are sent by that port). The router selects an input port to grant access to a particular output port in a way that insures that only one input is selected for routing at a particular time. In cases where two or more input ports have packets available to transmit on a particular output port, the router is generally responsible for selecting the order in which the packets are transmitted on a particular output port. As will be appreciated, multiple data packets may flow through a router simultaneously, using a crossbar arrangement, for example, with no more than one data packet being routed to any one output port at a time. Current systems implement an arbitration scheme to prioritize the transmission of packets through the router. For instance, an arbitration algorithm may be provided that selects between contending input ports in a round-robin fashion. Regardless of the mechanism used, designers are often challenged to design networked systems that arbitrate fairly in transmitting data packets.

BRIEF DESCRIPTION OF THE DRAWINGS

Advantages of the invention may become apparent upon reading the following detailed description and upon reference to the drawings in which:

FIG. 7 is a diagrammatic view of an exemplary data packet formatted in accordance with alternate embodiments of the present invention;

DETAILED DESCRIPTION OF SPECIFIC EMBODIMENTS

Figure 1:
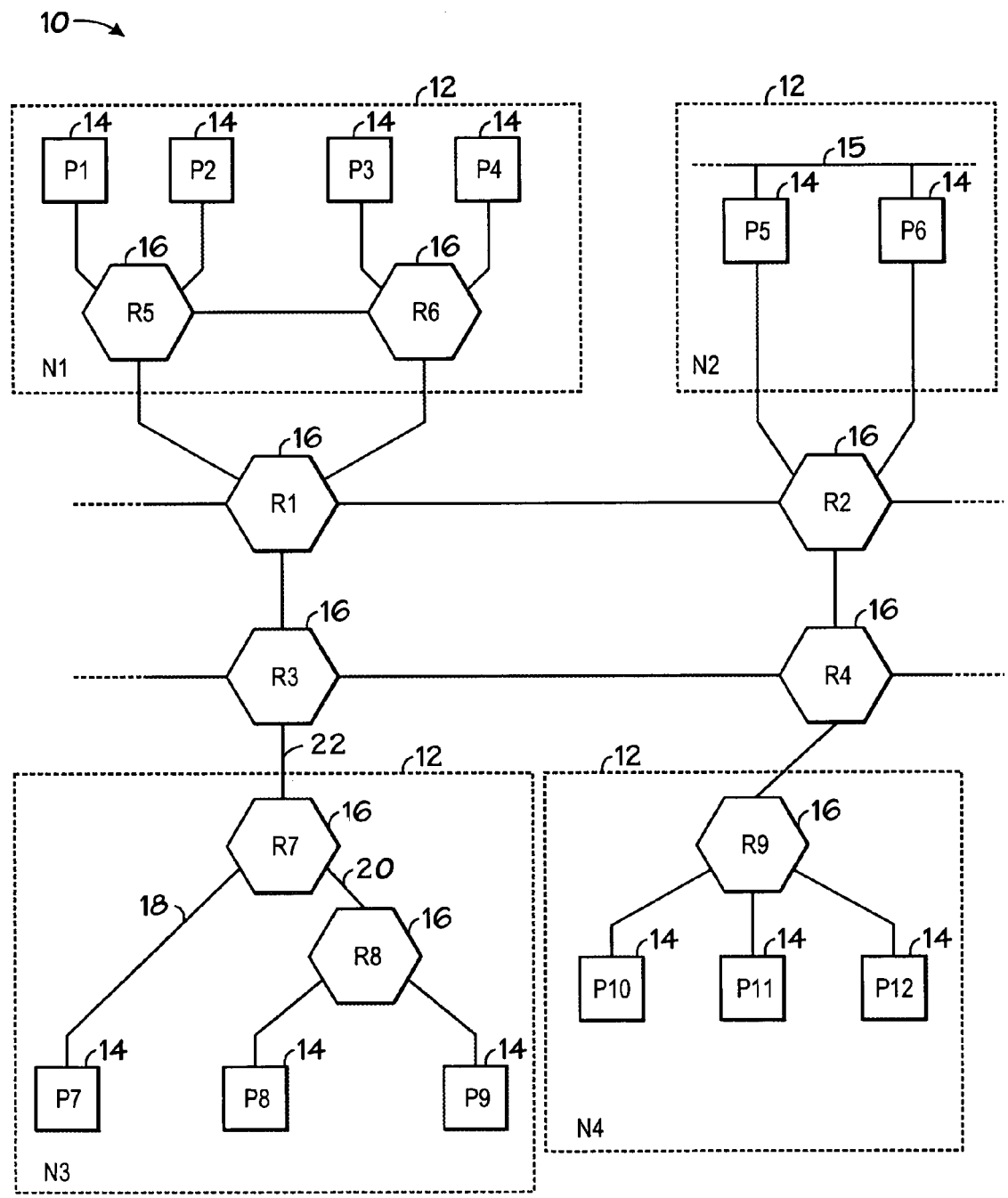
FIG. 1 illustrates an interconnected network system and associated routers in accordance with embodiments of the present invention.

One or more exemplary embodiments of the present invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

It has been discovered that in systems that use multiple routers to connect multiple networks, arbitration throughout the network system may become unfair in a global sense, even if an individual router is arbitrating fairly among its respective inputs. For instance, in current systems, a router may include a number of input ports that are configured to receive data packets from a number of sources (e.g., processors). The allocation of sources to inputs may not be equal. For example, a router may include two inputs. The first input port may be configured to receive data packets from a single source, while the second input port may be configured to receive data packets from multiple sources (N sources). Without proper biasing, the single device (source) connected to the first input port may win arbitration to route to an output port 50% of the time. As a whole, the sources connected to the second input port will win arbitration to the output port the other 50% of the time. Each of the individual sources coupled to the second input port will win arbitration 50/N % of the time. If N is large (say 100) this may constitute a very small portion of the bandwidth (e.g., 0.5%). In a network system configured is such a way, even if every router in the system is locally fair (i.e., arbitration is set to guarantee that every input port of the router is allocated an equal service level to each output), processors that share an input port may suffer a reduced service level compared to the service level of those processors exclusively allocated to a single input port.

Further, the communication paths that have the fewest number of routers along the path will experience a significantly greater service level. The greater service level comes at the expense of those communication paths (e.g., processor-to-processor, processor-to-I/O, I/O-to-I/O) that have large numbers of routers therebetween. Each data packet that is delivered to a router arrives at an input port of the router and must vie for contention among the other data packets arriving at that input port as well as those arriving at other input ports for the particular router. Accordingly, increasing the number of routers through which the data packet must traverse in route to a target destination results in a lower overall service level since current systems may not provide adequate arbitration in a global sense. In other words, while each router in a networked system may be locally fair, the network system may not be globally fair for all packets routed through the network system.

FIG. 1 illustrates a network system 10 in accordance with embodiments of the present invention. The system 10 includes a mechanism for providing an optimized arbitration scheme to provide a globally fair network under varying loads (i.e., uniform or non-uniform) in a topology-independent manner. For simplicity, only the processors 14 are illustrated in each of the networks 12. However, as will be appreciated by those skilled in the art, each processor 14 generally includes an associated memory, as well as one or more associated I/O devices. Further, each network 12 may include a number of shared resources, such as shared storage devices and/or input/output (I/O) devices. The techniques described herein may also be applicable to communication between I/O devices and/or storage devices communicating through the routers 16 from one network 12 to another network 12. As previously described, without a globally fair network system 10, certain processor nodes may overuse the network resources of the system 10 at the expense of system peers. In accordance with embodiments of the present techniques, a mechanism for optimizing global fairness among all of the switching devices and resources in the system is provided.

The network system 10 includes a plurality of networks 12, specifically illustrated as networks N1-N4. Each of the networks 12 includes a number of processors 14, specifically illustrated as processors P1-P12. In the present exemplary embodiment, four (4) processors P1-P4 are illustrated in the first network N1. Two (2) processors P5-P6 are illustrated in the second network N2. Finally, three (3) processors P7-P9 are illustrated in the third network N3, and three (3) processors P10-P12 are illustrated in the fourth network N4. As will be appreciated, the system 10 may include any desirable number of networks 12, and each of the networks may include any desirable number of processors 14.

The network system 10 also includes a number of switching mechanisms, such as routers 16, specifically illustrated as routers R1-R9. Alternatively, the switching mechanism between networks 12 may include switches (not shown), instead of the routers 16. As described in more detail below, certain switching mechanisms are included in an external switching fabric between the networks 12 (here the routers R1-R4) and are configured to route packets between the networks 12 based on a packet field that carries an address or number corresponding to the destination network 12 of the data packet. Other switching mechanisms are included in internal switching fabrics located within respective networks 12 (here the routers R5-R9) and are configured to route packets within a respective network 12.

Generally, the term "router" may be used to describe a device capable of routing at Layer 3 of the International Organization for Standardization (ISO) Open Systems Interconnect (OSI) reference model. ServerNet technology is generally associated with having routers, for instance. In contrast, the term "switch" may be used to describe how far up in the protocol stack the switches are capable of making routing decisions (e.g., Layer 2 switches, Layer 3 switches, etc.). Switches are generally considered to be less complex than routers. However, both switches and routers are configured to route data packets. As used herein, embodiments of the present invention may employ either routers or switches. Accordingly, as used herein, "routers" and "switches" may be used interchangeably to refer to any switching mechanism capable of routing data packets. As described further below, the switching mechanism (e.g., routers) may be used within a single network to connect processors and/or I/O devices to one another, or may be used between the networks 12 to connect processors and/or I/O devices from one network to another within the network system 10.

In the present exemplary system 10, the networks 12 are interconnected to each other by an external switching fabric. In the present exemplary embodiment, the external switching fabric includes routers R1,R2, R3, and R4 and the links connecting such routers. The routers R1-R4 in the external fabric are configured with the ability to route packets between the networks 12 based on a packet field that carries the network address of the destination processor or I/O device in a particular network 12. A similar field in the packet contains the network address of the source processor or I/O device for identification of the source where the packet originated, as described further below.

Further, each network 12 includes a plurality of processors 14 and I/O devices (not shown). The processors 14 and I/O devices within a network 12 can be interconnected in different ways. For example, the processors within a network 12 can be interconnected by an internal switching fabric as depicted in networks N1, N3, and N4 in FIG. 1, for example. The internal switching fabric of network N is formed by the routers R5-R6 and associated links. The internal switching fabric of network N3 is formed by the routers R7 and R8 and associated links. The internal switching fabric of network N4 is formed by the router R9 and associated links. Alternatively, the processors within a network can be interconnected by a different type of interconnect other than a switching fabric. For example, the processors within the network N2 are interconnected by a bus 15.

As discussed above, the networks 12 are connected together through an external switching fabric (here routers R1-R4) to achieve the benefit of direct, low-latency connectivity between processors 14 and I/O devices in any of the networks 12. Packets that are addressed from one network 12 to a different network 12 are sent to the external fabric for proper inter-network routing. Packets routed by the external fabric between the networks 12 have a source which is a processor 14 or I/O device in one network 12 and a destination which is a processor 14 or I/O device in a different network 12. In accordance with another exemplary embodiment of a network 12 the processors and I/O devices are interconnected by two independent internal switching fabrics (or buses, etc.), as opposed to only one (as shown in FIG. 1), for fault-tolerance purposes. Similarly, in another exemplary embodiment of the network system 10 the networks 12 may be connected by two independent external switching fabrics for fault-tolerance purposes. As will be appreciated, the system 10 may comprise any desirable number of networks 12, and each of the networks 12 may comprise any desirable number of processors 14, subject to architectural addressing limits of the particular implementation. For example, ServerNet uses 20-bit network addresses that uniquely identify each processor or I/O device attached to the network system 10. This allows for a maximum of $2^{20}=1,048,576$ processors and I/O devices connected through the ServerNet implementation of the network system 10.

In accordance with previous systems, a packet originating from one processor may be unfairly routed in a global sense. For instance, from a global perspective, processors P5 and P6 in the network N2 will receive unfair resource allocation compared to the other processors P1 and P2 in the network N1 when routing packets to the processor P12. Further, if a packet is being routed from the processor P1 to the processor P12 of FIG. 1, the packet may be transmitted through routers, R5, R1, R2, R4 and R9. However, transmitting a data packet from the processor P5 to the processor P12 only traverses three routers (R2, R4 and R9). Even if each router 16 in the system 10 includes an unbiased arbitration scheme to guarantee that every port of the router is allocated an equal service level to each output, and thus is locally fair, those processor-processor paths that have the fewest number of routers involved in the path will receive a significantly greater service level. This result will come at the expense of those processor-processor paths that have larger numbers of routers involved, such as from the processor P1 to the processor P12, for instance.

To further illustrate how traditional networks may be globally unfair, the network N3 may be considered. As illustrated in FIG. 1, the router R7 includes two input ports 18 and 20 which may receive data packets that contend for a single output port 22. Specifically, the input port 18 receives data packets from a single source, here the processor P7. The input port 20 receives data packets from each of the processors P8 and P9 via the router R8. As will be appreciated, the output port 22 is coupled to a target destination, such as another switching mechanism, here the router R3. If the router R7 receives an incoming data packet from each of its input ports 18 and 20, the router R7 is tasked with arbitrating among the contending inputs in order to route the contending data packets to the output port 22 in a particular order. It should be noted that in the present example, packets from processors P8 and P9 arrive at the same input port 20 of router R7. Consequently, the order in which the packets from processors P8 and P9 are routed in this example relative to each other (i.e, packet from processor P8 first followed by the packet from processor P9) is not defined by a round-robin order among input ports. Rather, the example describes a situation whereby: (a) input port 18 receives one packet from processor P7 contending for output port 22; and (b) input port 20 receives one packet from processor P8 contending for output port 22, and that packet is followed shortly thereafter by one packet from processor P9 contending for output port 22. The relative order in which packets from processors P8 and P9 are routed in this particular example is determined by the relative order of arrival of such packets in input port 20. However, considering a constant stream of data packets from each of the processors P7, P8 and P9, even if the router R7 is locally fair, giving equal allocation to each of the input ports 18 and 20, the bandwidth afforded to the processors P8 and P9 will be less than the bandwidth afforded to the processor P7, as previously described.

In accordance with embodiments of the present invention, a source identification (SID) mechanism and associated arbitration mechanism are implemented to determine which input port and associated data packet are selected by a router for transmission to a particular output. The SID is simply an identification uniquely corresponding to the source of a data packet. The SID history mechanism maintains the history of when a data packet having a particular SID was last routed to an input port of a particular router. When multiple data packets arrive from multiple input ports, the router will choose the packet with a SID that has been routed least recently, regardless of how many sources share the particular input port. If two or more packets arrive and it is not possible to determine which SID was least recently routed the router may be configured to choose one of the contending packets in a round-robin fashion. Alternatively, the contending packets may be chosen pseudo-randomly.

Figure 2:
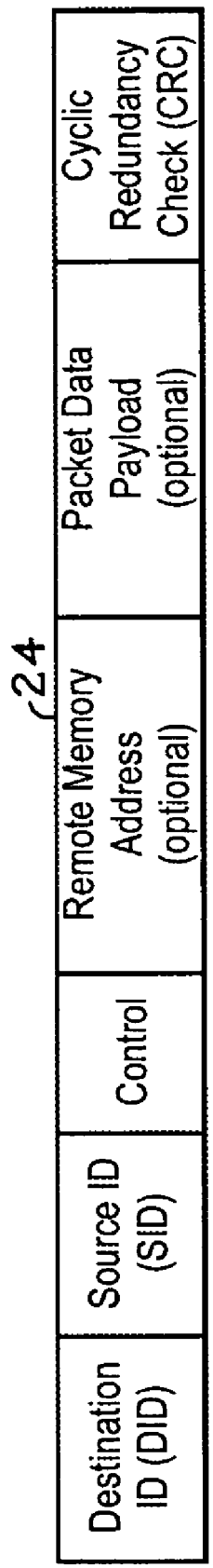
FIG. 2 is a diagrammatic view of an exemplary data packet formatted in accordance with embodiments of the present invention.

In accordance with embodiments of the present invention, the source identification (SID) of an incoming data packet is provided along with the data packet and a SID history mechanism may be implemented to track the SID history at the router 16. The SID history may be used to process the requests in an order that provides a globally fair routing system, as described further below. FIG. 2 illustrates a data packet 24 formatted in accordance with an exemplary embodiment of the present techniques. As previously discussed, the data packet 24 includes a destination identification (DID). In accordance with embodiments of the present techniques, the data packet 24 also includes a source identification (SID), such that a router 16 may be employed to route the data packet associated with the least recently routed SID, as described in more detail below. As will be appreciated, the data packet 24 may also include control information, such as transaction type, remote memory address, packet data payload and/or cyclic redundancy check (CRC) information.

Figure 3:
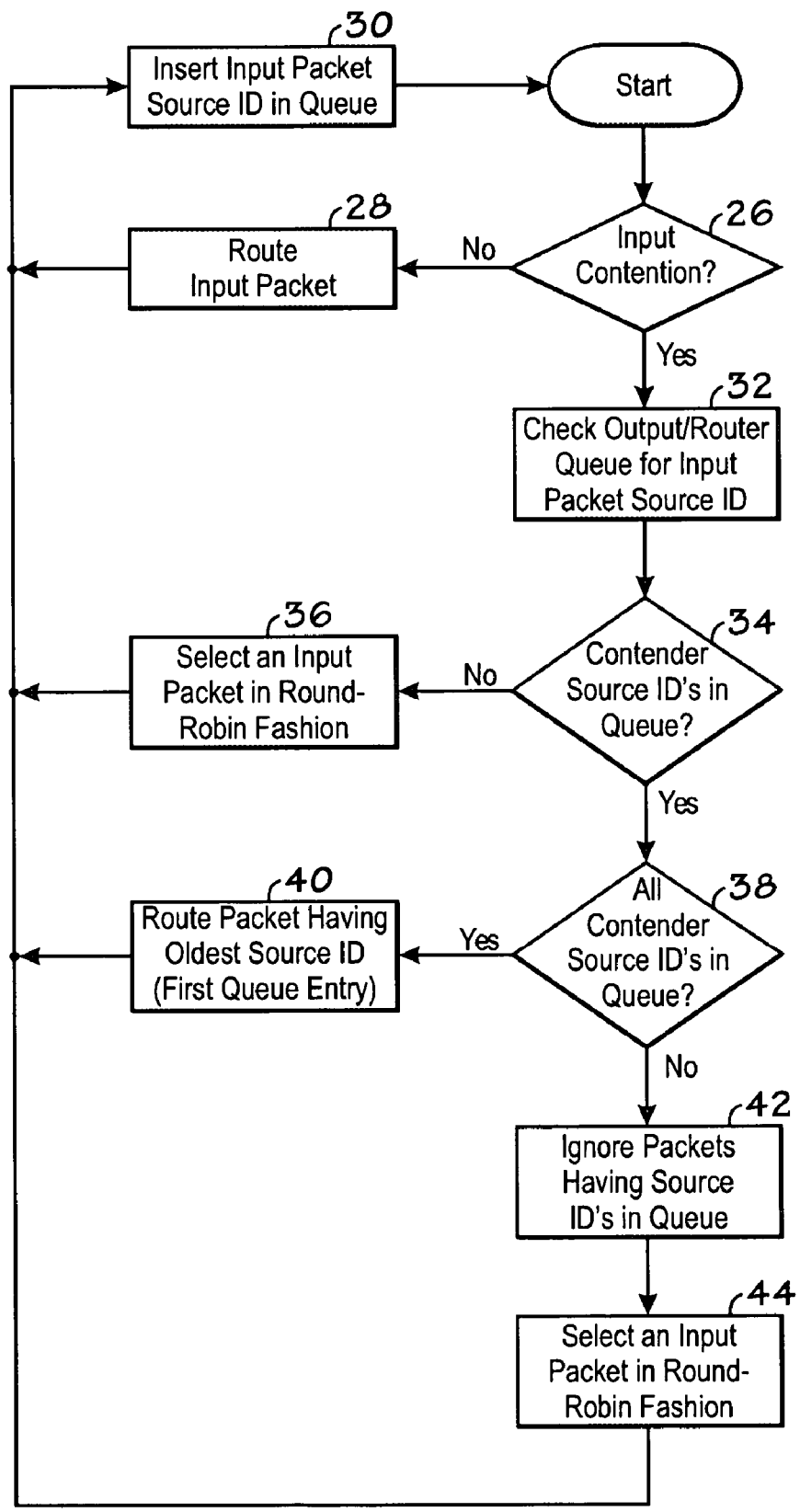
FIG. 3 is a flow chart illustrating an exemplary arbitration mechanism in accordance with embodiments of the present invention.

Referring now to FIG. 3, a flow chart illustrating the use of SID history and an associated arbitration mechanism is illustrated. Specifically, FIG. 3 provides an embodiment wherein a queue is implemented in the router 16 which may be managed in a least recently used (LRU) fashion. As will be appreciated, an LRU queue management scheme selectively keeps the most recently used items at the tail of a queue while allowing the older, less frequently used items to migrate to the head of the queue and eventually out of the queue altogether. As will be appreciated, the queue size may vary depending on the implementation.

In accordance with one exemplary embodiment, arriving packets for multiple input ports are received by the router 16 and each of the SIDs corresponding to the incoming packets is compared to the entries in the queue to determine which of the contending SIDs had a data packet routed least recently. The packet having a SID that was least recently processed is selected for service and the associated SID from the data packet is moved to the tail of the queue, making it the most recently used item. Various rules may be implemented if one or all of the incoming packets contain SIDs that are not resident in the queue, as further described with reference to FIG. 3. For simplicity, the overall concept of implementing queues to track the SIDs will be described with reference to FIG. 3. A more detailed discussion of the various scenarios associated with implementation of the queues will be further described with reference to FIGS. 4-6. An alternate embodiment of the present techniques of employing queue structures to track SIDs will be described with reference to FIGS. 7-10. Finally, an alternate embodiment of the present techniques, wherein a cache is used to index SIDs for routing is described with reference to FIGS. 11 and 12.

Referring initially to FIG. 3, the router 16 initially determines whether there is contention among the input ports for a single output, as indicated in block 26. In other words, the router 16 will determine whether there are input packets waiting for routing from more than one source (i.e., input packets having dissimilar SIDs) with a common output port. If there is no input contention, and thus, there is only one input packet awaiting routing to a particular output port, the input packet is simply routed as indicated in block 28 and the source identification (SID) corresponding to the input packet is inserted into the SID history queue as indicated in block 30. In the present exemplary embodiment, the SID will be inserted into the tail of the queue, thereby indicating that it was the most recently routed SID.

Alternatively, if the router 16 determines that there is input contention and therefore there is more than one input packet with more than one SID vying for a single output port, the router 16 compares each of the SIDs corresponding to the contending input packets to the SIDs stored in the queue, as indicated in block 32. Each router 16 may include a single SID history queue, or may include a respective queue for each output port. For those applications in which cost is of concern, it may be more advantageous to implement a single SID history queue. For those applications in which cost is less of an issue, but better (more fair) routing is desired, a respective queue for each output port may be more desirable. If none of the contending SIDs are stored in the queue (block 34), the contending packets are simply routed in a round-robin fashion as indicated in block 36. Initially, the packet received at the lowest order input packet may be selected for routing. For instance, and referring briefly to FIG. 1, if each of the input ports 18 and 20 include a contending packet wherein none of the contending SIDs are found in the queue, the router R7 may choose the input packet having a SID associated with the processor P7. Subsequently, if the only remaining input packets awaiting routing are those associated with the processor P8 and the processor P9, the router R7 may choose to route the data packet associated with the processor P8 next, followed by the routing of the packet associated with the processor P9. As previously described with reference to block 30, once a packet is chosen and routed, the SID corresponding to the associated packet is inserted into the queue. If the queue is an LRU queue, the SID will be inserted at the tail of the queue. The SID at the head of the queue will be discarded if a SID is inserted at the tail of the queue and the queue is full.

In accordance with one exemplary embodiment, the LRU queue may be initialized upon router power-up. Initially, the LRU queue is empty and does not contain any SIDS. The LRU queue is populated with valid SIDs as soon as the router begins routing data packets. No SIDs will be initially discarded until the LRU queue is full, unless a previous occurrence of the most recently routed SID exists in the queue, in which case the previous occurrence will be discarded when the most recently routed SID is inserted at the tail of the queue. If the LRU queue is deep enough (i.e., deeper than or equal to the number of SIDs traversing the router) the queue may never fill up and SIDs will never be discarded.

If all of the contending SIDs are in the queue as indicated in block 38, the router 16 chooses to route to the packet having the oldest SID (i.e., least recently routed), as indicated in block 40. In the present exemplary embodiment, the oldest SID will be the queue entry closest to the head of the queue. The router 16 will process the contending packets in the order in which their SIDs occur in the queue as previously described, and as each packet is routed, the corresponding SID will be inserted into the queue, here into the tail of the queue, as indicated in block 30.

If some of the contending packets have SIDs in the queue and some of the contending packets do not, the contending input packets having SIDs in the queue will initially be ignored, as indicated in block 42. As will be appreciated, the SIDs of contending packets not appearing in the queue will have been routed less recently than any of the input packets having associated SIDs stored in the queue since as each input packet is routed, the corresponding SID is stored in the tail of the queue. If the SIDs are not found in the queue the associated input device has not previously transmitted a data packet or more likely, the SID entry is so old that it has fallen off of the end of the queue. Ignoring the packets having SIDs in the queue, the router 16 will route the remaining contending packets in a round-robin fashion, starting with the lowest order input packet for instance, as indicated in block 44. Once an input packet is routed, the SID for the associated input packet is inserted into the tail of the queue as indicated in block 30.

Figure 4:
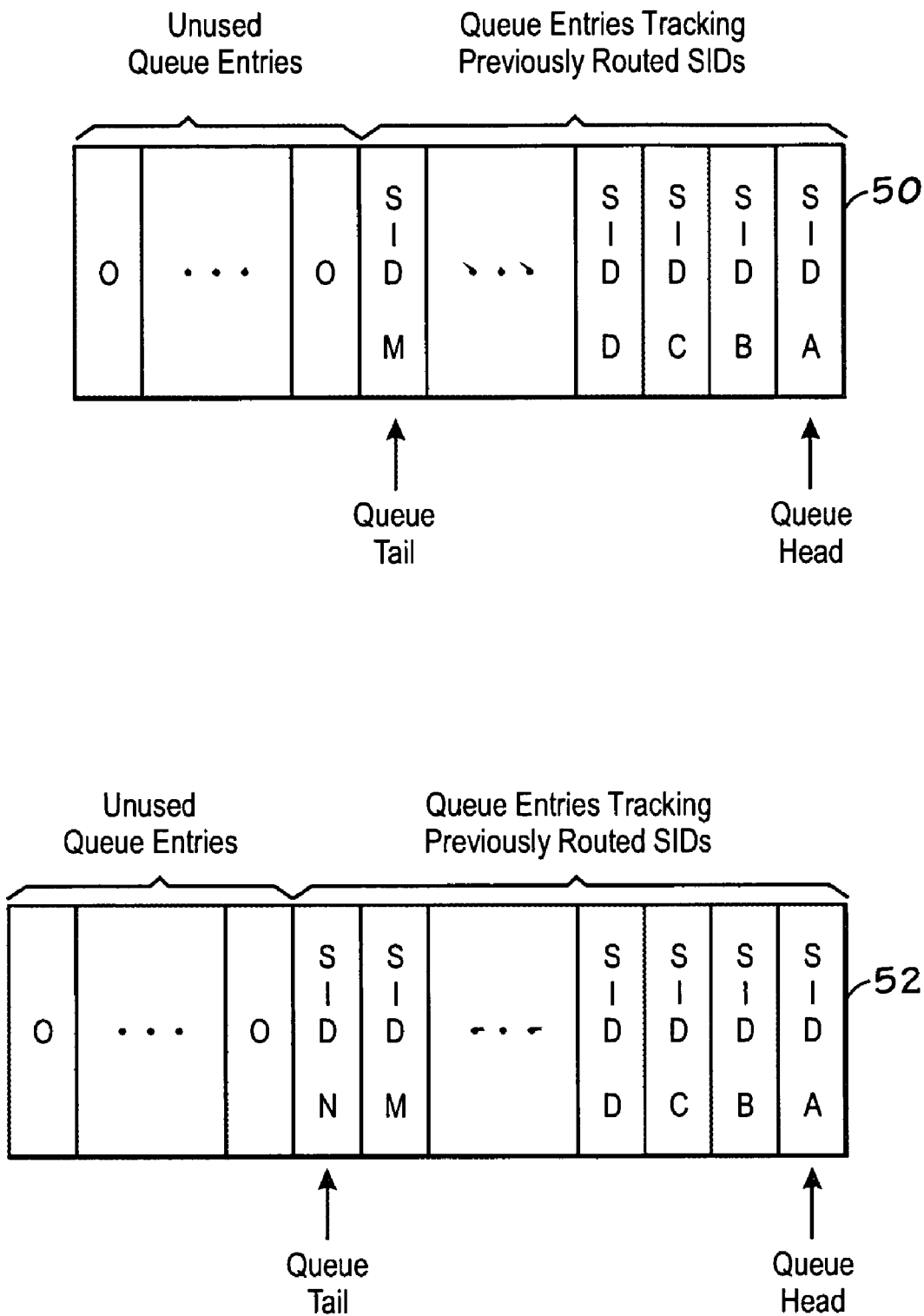
FIGS. 4-6 are diagrammatic views of before and after queues illustrating the insertion of a source identification into the queues under different circumstances, in accordance with embodiments of the present invention.
Figure 5:
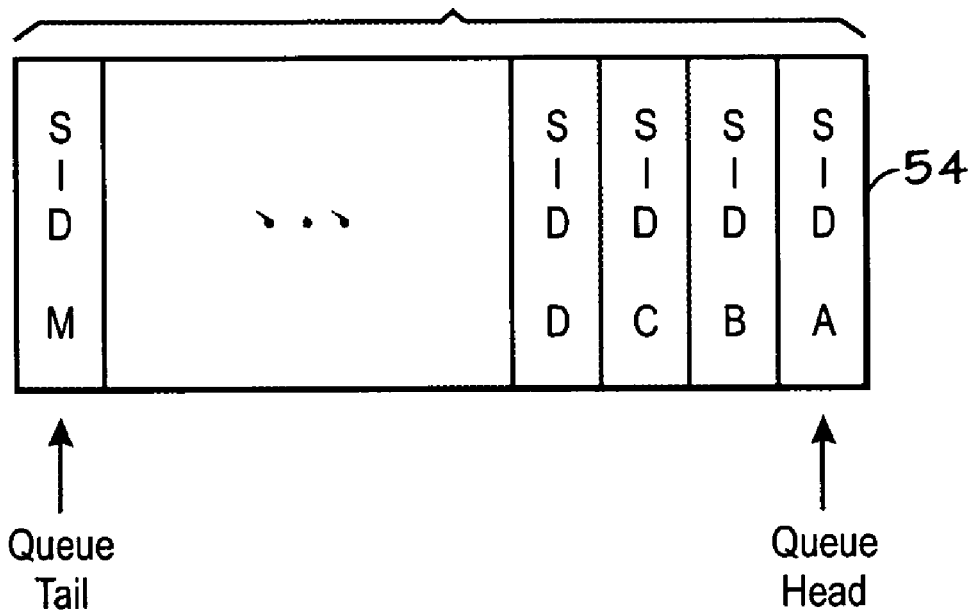
Figure 5:
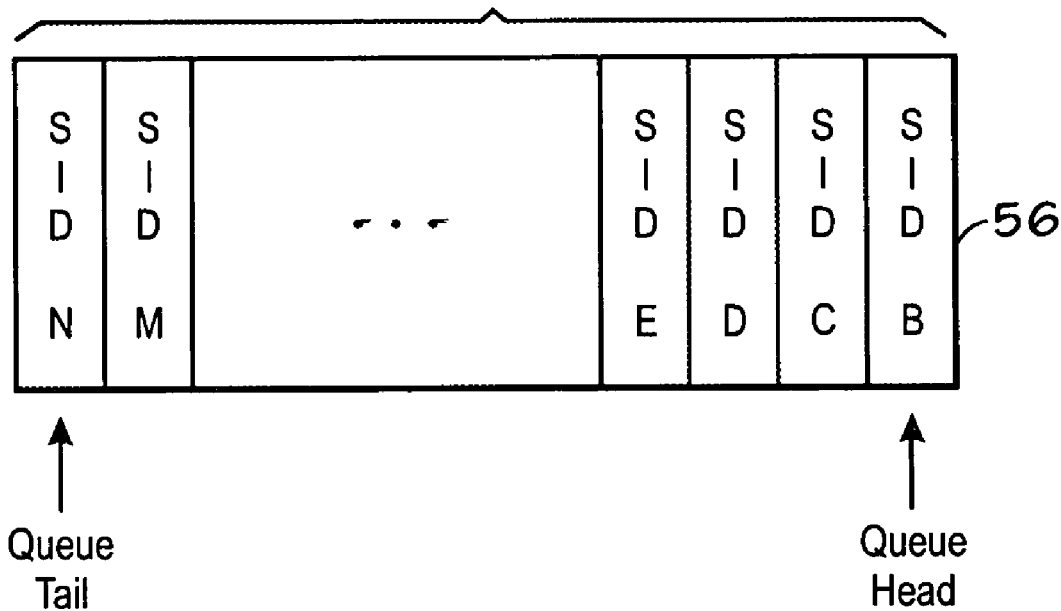
Figure 6:
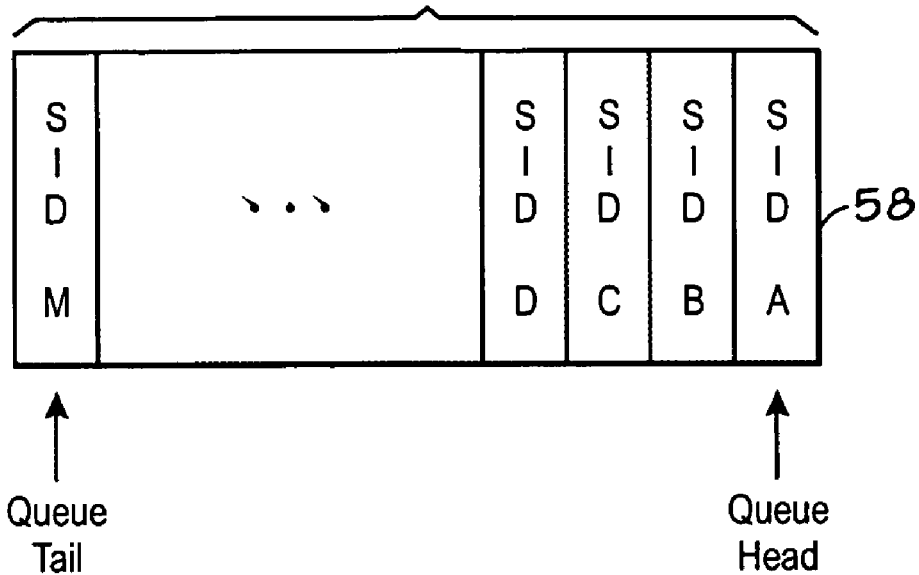
Figure 6:
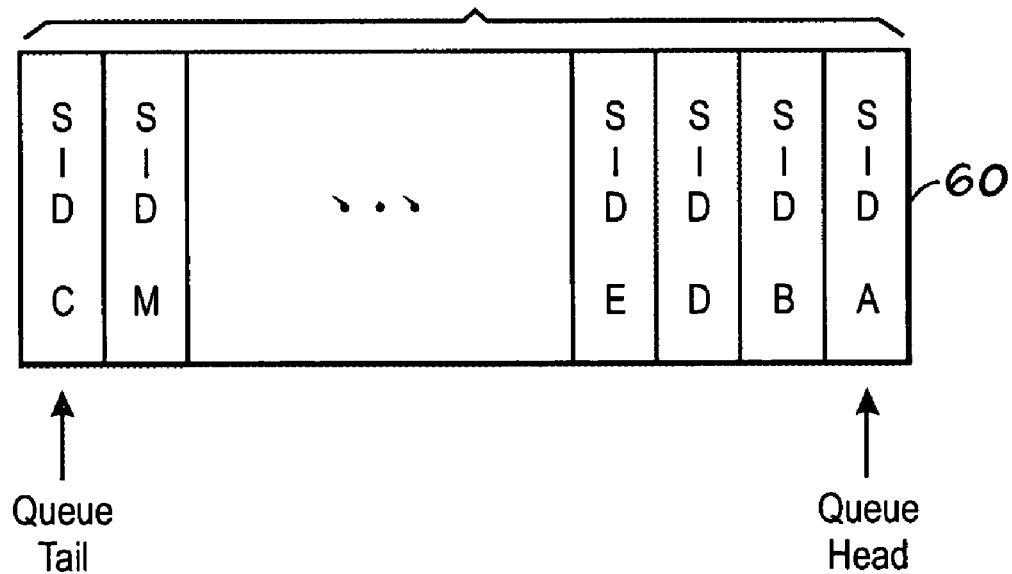

As described above, a number of scenarios are possible when the routed SID is inserted at the tail of the queue. FIGS. 4-6 illustrate the possible scenarios and how they are handled in accordance with embodiments of the present invention. Specifically, FIG. 4 illustrates the situation wherein there is not a previous occurrence of the inserted SID in the queue and the queue is not full. FIG. 5 illustrates the situation wherein there is not a previous occurrence of the inserted SID in the queue and the queue is full. FIG. 6 illustrates the situation wherein there is a previous occurrence of the inserted SID in the queue.

Referring now to FIG. 4, a queue is illustrated before the routing of the incoming data packet having a SID=N. The state of the queue before insertion ("before queue") is generally represented by the before queue 50. The before queue 50 includes a number of entries tracking previously routed SIDs, illustrated as SID A, SID B, SID C, SID D . . . SID M. The head of the before queue 50 points to the entry SID A, while the tail of the before queue 50 points to the entry SID M. As previously described, FIG. 4 illustrates the situation wherein there is not a previous occurrence of the inserted SID (SID N) in the queue 50 and the queue 50 is not full. Thus, the before queue 50 also includes a number of unused entries. When the incoming packet associated with the SID N is routed, it is inserted at the tail of the queue. The state of the queue after insertion of the SID N ("after queue") is generally represented by the after queue 52.

Referring now to FIG. 5, the second scenario is illustrated, wherein there is not a previous occurrence of the inserted SID in the queue and the queue is full. In this scenario, the state of the queue before insertion ("before queue") is generally represented by the before queue 54. The before queue 54 includes a number of entries tracking previously routed SIDs, illustrated as SID A, SID B, SID C, SID D . . . SID M. The head of the before queue 54 points to the entry SID A, while the tail of the before queue 54 points to the entry SID M. Because the before queue 54 is full in this scenario, there are no unused entries. When the incoming packet associated with the SID N is routed, it is inserted at the tail of the queue. The state of the queue after insertion of the SID N ("after queue") is generally represented by the after queue 56. As illustrated in the after queue 56, the SID previously at the head of the before queue 54 (SID A) will be discarded when the routed SID (SID N) is inserted at the tail of the queue. All of the other entry points in the after queue 56 are incremented by one entry point such that the head of the after queue 56 points to the entry SID B and the tail of the after queue 56 points to the entry SID N.

Referring now to FIG. 6, the third scenario is illustrated, wherein there is a previous occurrence of the inserted SID in the queue. The before queue 58 includes a number of entries tracking previously routed SIDs, illustrated as SID A, SID B, SID C, SID D . . . SID M. The head of the before queue 58 points to the entry SID A, while the tail of the before queue 58 points to the entry SID M. As will be appreciated, in this situation, it does not matter whether the queue is full or not. In this scenario, the state of the queue before insertion ("before queue") is generally represented by the before queue 58. For illustrative purposes, the before queue 58 is illustrated as being full, and thus, there are no unused entries. When an incoming packet having a previously indexed SID (here, SID C) is routed, the associated SID is inserted at the tail of the queue. The state of the queue after insertion of the SID C ("after queue") is generally represented by the after queue 60. As illustrated in the after queue 60, the previous entry of SID C is discarded when the newly routed packet having the SID C is inserted at the tail of the queue. All of the entry points occurring ahead of the original SID C in the before queue 58, remain unchanged in the after queue 60. All of the entry points occurring before original SID C in the before queue 58 are incremented by one entry point in the after queue 60 and the SID C is inserted at the tail of the after queue 60.

The present exemplary embodiment may also implement a "quality-of-service" (QOS) feature to provide a bias in order to favor input packets being received from certain devices. For instance, for the present exemplary embodiment implementing a queue, a data item may be added to each input packet that specifies the depth within the queue that the corresponding SID should be placed following selection by the router 16 of the data packet. As will be appreciated, this feature grants a higher service level to the next packet that follows having the weighted SID. By weighting the SID as it is stored, the SID will not be placed at the tail of the LRU SID history queue and will therefore receive a more favorable priority next time a data packet arrives at the router 16 having the same SID as the previously weighted SID. A customer/client may specify a prioritization for data packets originating from certain sources such that the system can be biased accordingly, for instance. Further, the QOS feature may be implemented to prioritize data packets based on the particular contents of the data packets, which may be determined by the application or higher protocol layers. By including a QOS field into the data packet, the router 16 will be able to prioritize certain packets based on packet content, as reflected by the biasing in the QOS field, as described further below.

FIG. 7 illustrates a data packet 62 formatted in accordance with another exemplary embodiment of the present techniques, wherein the QOS feature is included in the data packet to bias the routing of a subsequent data packet having the same SID as the data packet 62. As previously discussed with reference to the data packet 24 of FIG. 2, the data packet 62 includes a destination identification (DID) and a source identification (SID), such that a router 16 may be employed to route the data packet associated with the least recently routed SID, as previously described. As will be described further below with respect to FIGS. 8-10, the QOS data enables biasing of a future data packet having the same SID as that of the data packet 62. The data packet 62 may also include control information, such as transaction type, remote memory address, packet data payload and/or cyclic redundancy check (CRC) information.

Figure 8:
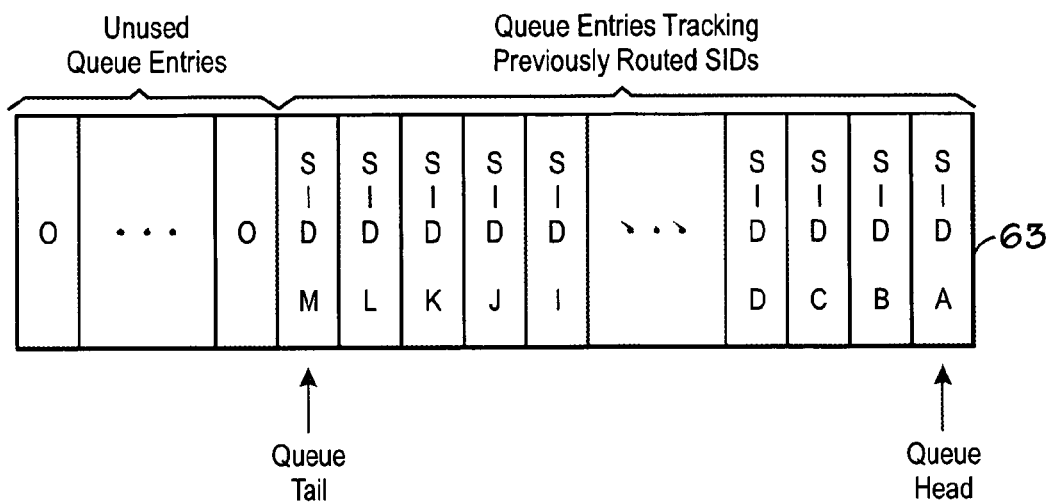
FIGS. 8-10 are diagrammatic views of before and after queues illustrating the insertion of a source identification and a quality of service bias into the queues under different circumstances, in accordance with alternate embodiments of the present invention.
Figure 8:
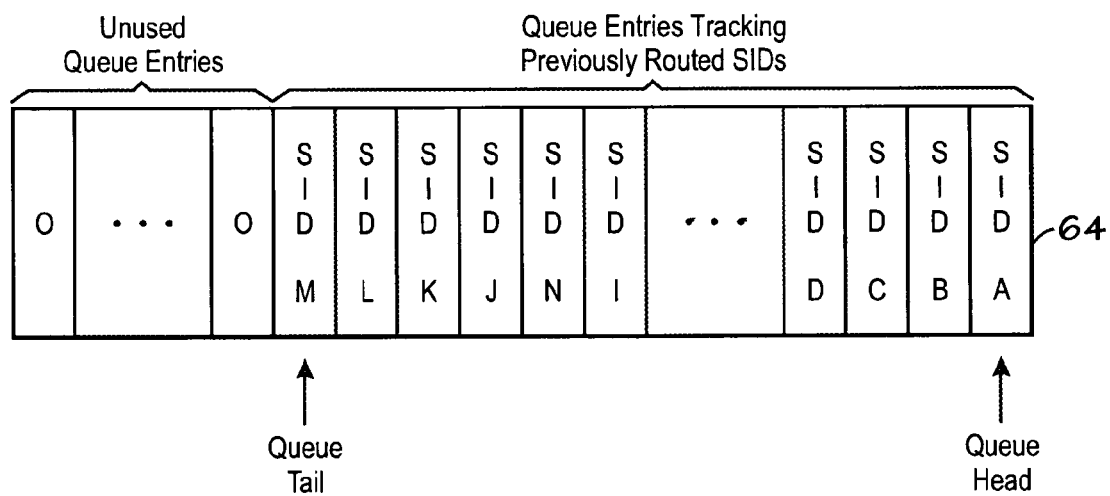
Figure 9:
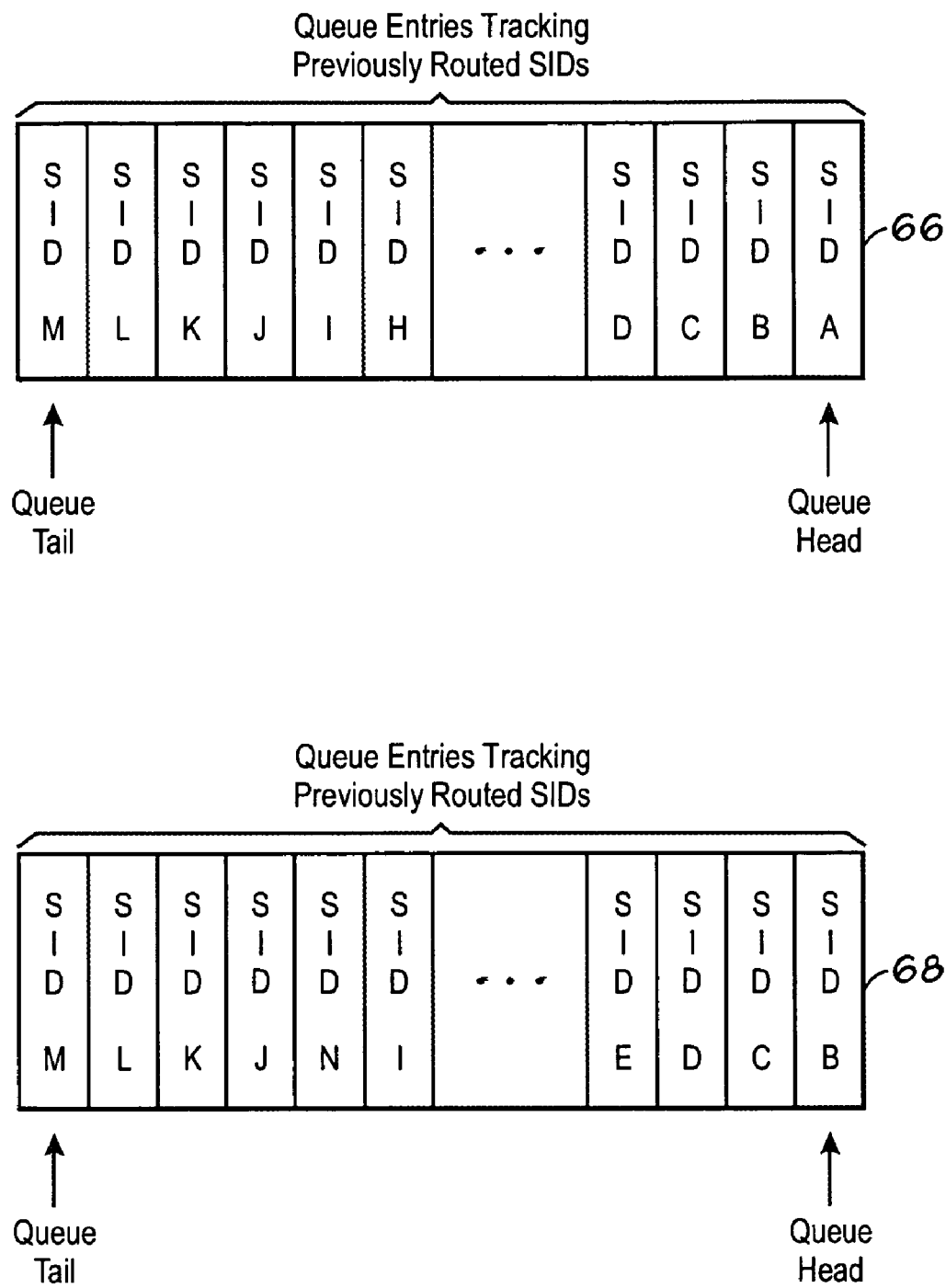
Figure 10:
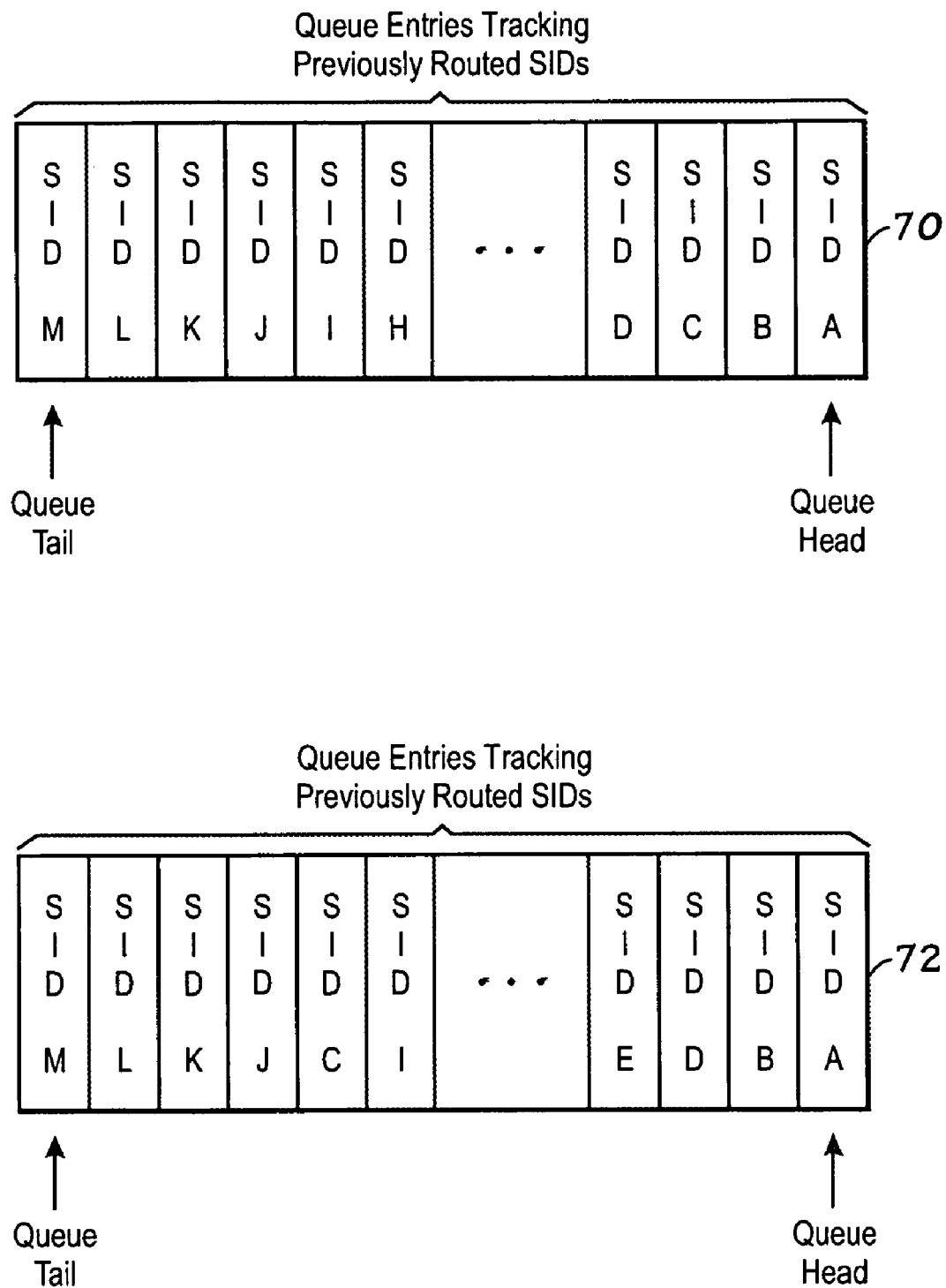

As with the scenarios described above with reference to the routing of data packets without the QOS biasing information (FIGS. 4-6), the same three scenarios are possible with the data packets having the QOS feature. FIGS. 8-10 illustrate the possible scenarios and how they are handled in accordance with embodiments of the present invention employing the QOS biasing feature. Specifically, FIG. 8 illustrates the situation wherein there is not a previous occurrence of the inserted SID in the queue and the queue is not full. F*ig*.9 illustrates the situation wherein there is not a previous occurrence of the inserted SID in the queue and the queue is full. FIG. 10 illustrates the situation wherein there is a previous occurrence of the inserted SID in the queue. While the exemplary embodiments illustrated in FIGS. 8-10 employ a data packet having a QOS=4, any desirable QOS may be employed to bias a particular source.

Referring now to FIG. 8, a queue is illustrated before the routing of the incoming data packet having a SID=N, wherein the data packet has a QOS=4. The state of the queue before insertion ("before queue") is generally represented by the before queue 63. The before queue 63 includes a number of entries tracking previously routed SIDs, illustrated as SID A, SID B, SID C, SID D . . . SD I, SID J, SD K, SID L, and SID M. The head of the before queue 63 points to the entry SID A, while the tail of the before queue 63 points to the entry SID M. As previously described, FIG. 8 illustrates the situation wherein there is not a previous occurrence of the inserted SID (SID N) in the before queue 63 and the before queue 63 is not full. Thus, the before queue 63 also includes a number of unused entries. Because the incoming data packet has QOS=4, when the incoming packet associated with the SID N is routed, it is inserted four (4) entry points ahead of the tail of the queue. The state of the queue after insertion of the SID N ("after queue") is generally represented by the after queue 64. As illustrated in the after queue 64, the previously existing entries in the before queue 63 located more than four entries ahead of the queue tail (SID A, SID B, SID C, SID D . . . SID I) are left unchanged once the data packet is routed and SID N inserted into the queue. The remaining entries previously present in the before queue 63 are decremented one entry point in the after queue. By implementing the QOS feature, the SID N will be promoted towards the head of the queue and dropped out of the queue sooner which means that a subsequent data packet having a SID=N will likely be routed faster because the router 16 will assume that data packets associated with SID N have been routed less recently than they actually have been routed.

Referring now to FIG. 9, the second scenario is illustrated, wherein there is not a previous occurrence of the inserted SID in the queue and the queue is full. The data packet still has a corresponding QOS=4. In this scenario, the state of the queue before insertion ("before queue") is generally represented by the before queue 66. The before queue 66 includes a number of entries tracking previously routed SIDs, illustrated as SID A, SID B, SID C, SID D . . . SID I, SID J, SID K, SID L, and SID M. The head of the before queue 66 points to the entry SID A, while the tail of the before queue 66 points to the entry SID M. Because the before queue 66 is full in this scenario, there are no unused entries. Because the incoming data packet has QOS=4, when the incoming packet associated with the SID N is routed, it is inserted four (4) entry points ahead of the tail of the queue. The state of the queue after insertion of the SID N ("after queue") is generally represented by the after queue 68. As illustrated in the after queue 68, the SID previously at the head of the before queue 66 (SID A) will be discarded when the routed SID (SID N) is inserted into the before queue 66. The previously existing entries in the before queue 66 located more than four entries ahead of the queue tail (SID B, SID C, SID D . . . SID I) are incremented by one entry point such that the head of the after queue 68 points to the entry SID B. As illustrated in the after queue 68, the previously existing entries in the before queue 66 located within four entry points of the tail (SID J, SID K, SID L and SID M) are left unchanged once the data packet is routed and SID N is inserted into the queue. The tail of the after queue 68 continues to point to the entry SID M.

Referring now to FIG. 10, the third scenario is illustrated, wherein there is a previous occurrence of the inserted SID in the queue. The data packet still has a corresponding QOS=4. The before queue 70 includes a number of entries tracking previously routed SIDs, illustrated as SID A, SID B, SID C, SID D . . . SID I, SID J, SID K, SID L, and SID M. The head of the before queue 70 points to the entry SID A, while the tail of the before queue 70 points to the entry SID M. As will be appreciated, in this situation, it does not matter whether the queue is full or not. For illustrative purposes, the before queue 70 is illustrated as being full, and thus, there are no unused entries. Because the incoming data packet has QOS=4, when the incoming packet associated with the SID C is routed, it is inserted four (4) entry points ahead of the tail of the queue. The state of the queue after insertion of the SID C ("after queue") is generally represented by the after queue 72. As illustrated in the after queue 72, the previous entry of SID C is discarded when the newly routed data packet having the SID C is inserted into the before queue 70. All of the entry points occurring ahead of the original SID C in the before queue 70 (SID A and SID B), remain unchanged in the after queue 72. All of the entry points occurring before original SID C in the before queue 70 and located more than four entries ahead of the tail (SID D, SID E . . . SID I) are incremented by one entry point in the after queue 72. As illustrated in the after queue 70, the previously existing entries in the before queue 70 located within four entry points of the tail (SID J, SID K, SID L and SID M) are left unchanged once the data packet is routed and SID C is inserted into the queue. The tail of the after queue 72 continues to point to the entry SID M.

In an alternate implementation, a router resident cache that is indexed by source identification (SID) may be implemented to store a local monotonic timestamp. This SID history mechanism caches the local time that a particular SID was last routed through the router 16. When two or more packets arrive, the SIDs associated with those data packets are used as indices to the cache, returning the previously stored local timestamp. Service is granted by the router 16 to the input packet that has an associated SID with the oldest timestamp value. The value is then updated to the current value of the local monotonic timestamp. When multiple packets arrive that are not currently known to the cache, a particular packet is selected in a round-robin fashion, as previously described. As an input packet is routed, the timestamp associated with the SID of the routed data packet is then placed in the cache. In accordance with one embodiment, the cache may be initialized upon router power-up. For example, all timestamps may be set to zero or to a negative value to indicate that they are not yet valid. As the router begins routing packets the cache entries will start being populated with valid timestamps.

In one exemplary embodiment, the size of the cache may be smaller than the total number of different SIDs. For example, a network using 20-bit long SIDs (e.g. ServerNet) would require a cache with $2^{20}$=1,048,576 entries if each entry is to be indexed directly by SID as described above. The present exemplary embodiment allows for smaller cache sizes, and indexing may be based on a subset of the bits in the SID (for example, indexing with 10 out of 20 bits would allow a cache size of $2^{10}$=1,024 entries). Advantageously, a smaller cache size (generally referred to hereinafter as a "small cache implementation") may provide economic benefits.

In accordance with the small cache implementation, each entry may store the non-indexing bits of the last routed SID that indexed to that particular cache entry, in addition to a local monotonic timestamp. The non-indexing SEID bits stored on each cache entry can be used to determine if an incoming packet carries the same SID as that of a previously routed packet. If the stored non-indexing SID bits and the incoming packet non-indexing SID bits match, the timestamp in the cache entry can be used as an accurate indication of when the SID was last routed. Otherwise, a condition exists whereby a previous packet with a different SID was routed, and the SID in that packet has the same set of indexing bits in the cache as the input packet currently being arbitrated. In this case, the timestamp stored in the entry does not provide an accurate indication of when the SID was last routed. However, the router can at least infer that the SID currently being arbitrated has not been routed since the timestamp was stored in the entry. This is sufficient to at least enforce global fairness on arbitration decisions based on the indexing bits of the SID.

In accordance with embodiments of the present invention, further enhancements are possible in small cache implementations. For example, an N-way associative cache can be used. In this case a total of N entries are indexed by a subset of the SID indexing bits. Each entry in an N-way set stores a timestamp and non-indexing SID bits for a packet that was last routed having: (a) the stored non-indexing SID bits and (b) the SID indexing bits used to index into the N-way entry set. If the stored non-indexing SID bits of any of the entries in the set match the non-indexing SID bits of a packet currently being arbitrated, the timestamp in that entry can be used as an accurate indication of when the SID was last routed. An N-way associative cache can be used to increase the likelihood that packets frequently sent by different sources having indexing SID bits that map to the same N-way entry set will find accurate timestamps stored in the cache.

It may also be advantageous to provide a system wherein the set of indexing bits in the small cache implementation is configurable. This can be used to optimize global fairness in networks with hierarchical routing properties. In a network with hierarchical routing, the internal fabrics (switching mechanisms within a network) of each network may have its routers configured to index into the cache using lower order bits of the SID. In contrast, routers in the external fabrics (switching mechanisms between/among networks) connecting the various networks could be configured to index into the cache using higher order bits of the SID.

Figure 11:
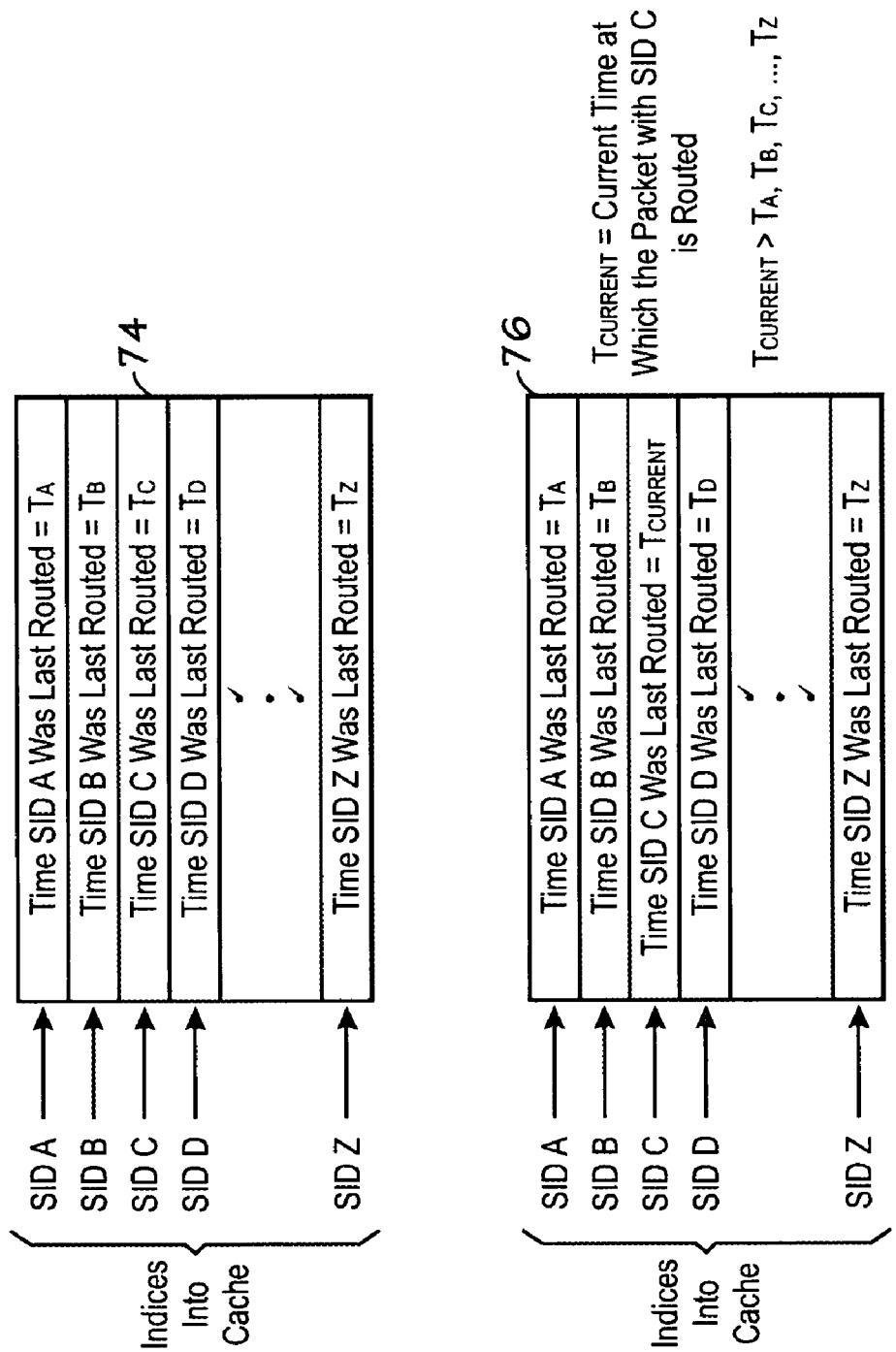
FIG. 11 is a diagrammatic view of a cache scheme which may be implemented in accordance with embodiments of the present invention.

FIG. 11 illustrates the present exemplary embodiment of employing a cache for direct indexing by SID. FIG. 11 includes a before cache 74 having entries stored therein. The cache entries are directly indexed by the source identification (SID A, SID B, SID C, SID D . . . SID Z) and include a corresponding local monotonic timestamp ($T_A$, $T_B$, $T_C$, $T_D$ . . . $T_Z$). In accordance with the present exemplary embodiment the SID history mechanism caches the local time that a particular SID was last routed. When two or more packets arrive, the SIDs associated with those data packets are used as indices to the cache, returning the previously stored local timestamp. Service is granted to the input packet that has an associated SID with the oldest timestamp value. The value is then updated to the current value of the local monotonic timestamp. When multiple packets arrive that are not currently known to the cache, a particular packet is selected in a round-robin fashion. As an input packet is routed, the timestamp associated with the SID of the routed data packet is updated in the cache, as illustrated in the after cache 76. As illustrated in the after cache 76, the cache state of the recently routed data packet having a SID=SID C is updated to reflect the time at which the packet was routed. Thus, $T_{CURRENT}$ is greater than the other time stamps in the after cache 76.

Further, a QOS feature may also be implemented with the cache mechanism. A data item may be added to each packet that specifies a negative time offset to be applied to the cache value when a timestamp is updated following selection and routing of the data packet. As will be appreciated, the negative offset provides a mechanism for granting a higher service level to the next packet that follows from that SID.

Figure 12:
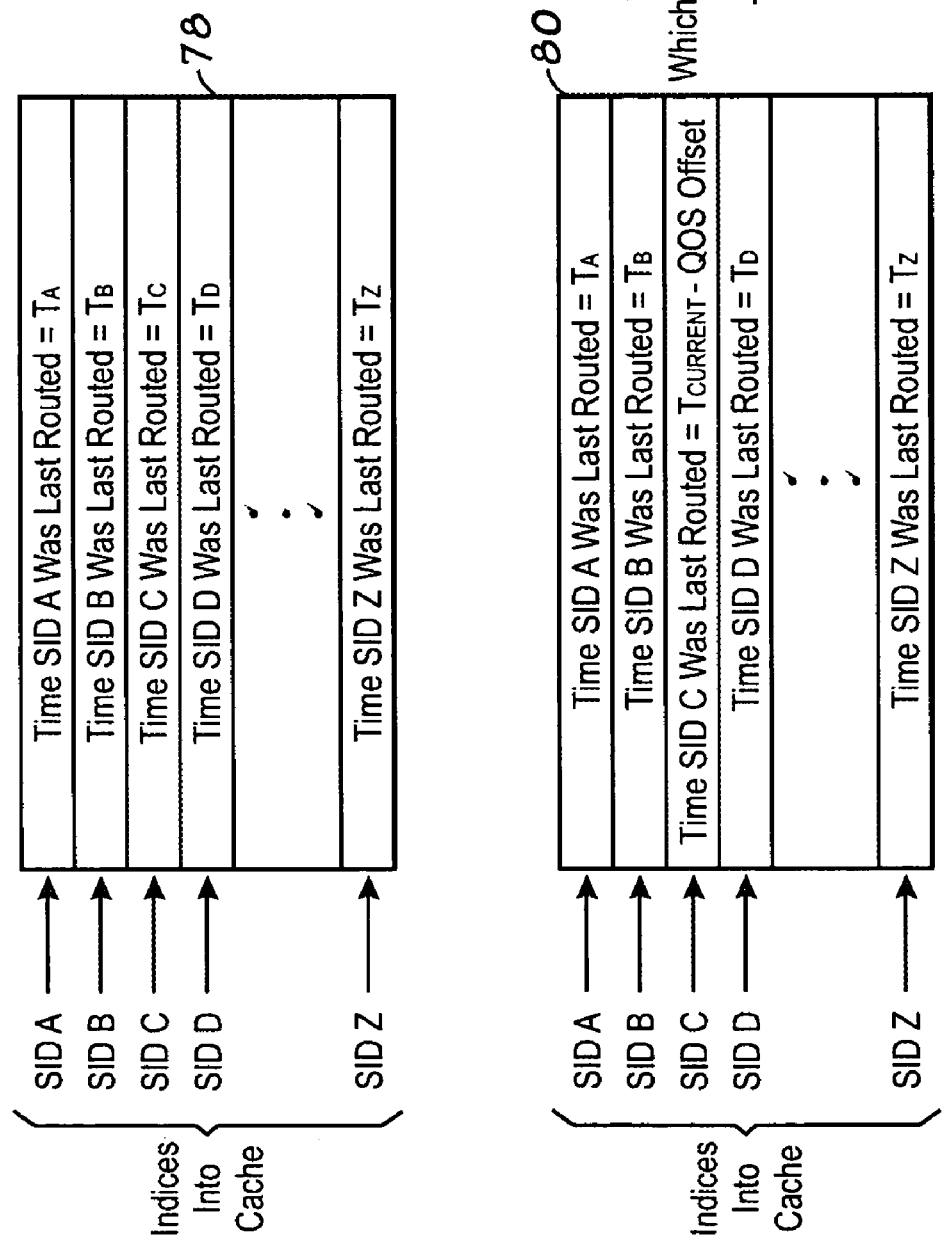
FIG. 12 is a diagrammatic view of a cache scheme incorporating a quality of service bias in accordance with alternate embodiments of the present invention.

FIG. 12 illustrates the present exemplary embodiment of employing a cache for direct indexing by SID and a QOS offset. FIG. 12 includes a before cache 78 having entries stored therein. The before cache 78 is identical to the before cache 74 (FIG. 11) in the non-QOS example. The cache entries are directly indexed by the source identification (SID A, SID B, SID C, SID D . . . SID Z) and include a corresponding local monotonic timestamp ($T_A$, $T_B$, $T_C$, $T_D$ . . . $T_Z$). As with the embodiment described in FIG. 11, the SID history mechanism caches the local time that a particular SID was last routed. When two or more packets arrive, the SIDs associated with those data packets are used as indices to the cache, returning the previously stored local timestamp. Service is granted to the input packet that has an associated SID with the oldest timestamp value. When multiple packets arrive that are not currently known to the cache, a particular packet is selected in a round-robin fashion. As an input packet is routed, the timestamp associated with the SID of the routed data packet is updated in the cache, including the negative time associated with the QOS offset, as illustrated in the after cache 80. As illustrated in the after cache 80, the cache state of the recently routed data packet having a SID=SID C is updated to reflect the time at which the packet was routed ($T_{CURRENT}$) minus the QOS offset.

Further, while the present exemplary embodiment employs a negative QOS offset to positively bias a particular source, a positive QOS offset may also be implemented to negatively bias a particular source. The presence of a positive QOS offset in a data packet will generally force the corresponding SID to remain in the cache longer than it would normally remain. Therefore, future packets having the same SID will be routed less frequently than if no QOS bias were employed.

Both the LRU queue and the SID cache provide improvement to router arbitration in packet-switched networks by choosing the packet to route to a destination based on a globally fair routing scheme. In this context, fairness of selection is determined by the allocation of the shared resource, in this case a shared outbound port and its associated target destination (e.g., a processor or I/O device directly connected to the outbound port) or destinations (e.g., multiple processors and/or I/O devices, which may be reachable through a chain of routers starting with a router directly connected to the outbound port). For systems implementing packet switched routers (or other switching mechanisms) in accordance with the present embodiments, global fairness throughout the system 10 may be achieved. With prior routing techniques, end-nodes may be unfairly serviced with worst-case delays for affected end-nodes that are on the order of $(p-1)^n$, where p=the number of ports on the router and n=the number of routers in a sequence between the two end nodes. Advantageously, in accordance with the present embodiments, the worst case delay is on the order of d*n, where d=average number of entries in the LRU queue of a router and n=the number of routers in a sequence. The average number of entries in the LRU queue of a router depends on the network topology and the router implementation. For example, consider a linear topology comprised of n routers with ports each. The first router in the chain will have p-1 input ports (each connected to a processor or I/O device with a distinct SID) contending for the output port leading to the second router in the chain. In the worst case, the LRU queue of the first router will be populated with p-1 distinct SIDs. The second router in the chain will have one input port connected to the first router in the chain, p-2 input ports connected to additional processor and/or devices, and an output port connected to a third router. In the worst case, the LRU queue of the second router will be populated with (p-1)+(p-2) distinct SIDs (i.e., (p-1) SIDs corresponding to packets sent by processors and/or I/O devices connected to the first router and (p-2) SIDs corresponding to packets sent by processors and/or I/O devices connected to the second router). By a similar argument, the LRU queue of the n-th router will in the worst case be populated with (p-1)+(p-2)*(n-1)=1+n*(p-2) distinct SIDs. Assuming a router implementation in which the LRU queue is deep enough to store up to 1+n*(p-2) SIDs, the total number of entries in the LRU queues of all n routers is [1+(p-2)]+[1+2*(p-2)]+ . . . +[1+n*(p-2)]=n+(p-2)*n*[(n+1)/2]. The average number of entries in the LRU queue of each router is d={n+(p-2)*n*[(n+1)/2]}/n=1+(p-2)*[(n+1)/2]. In accordance with the present embodiments, the worst-case delay for a linear topology comprised of n routers with p ports each is on the order of n+(p-2)*n*[(n+1)/2]. With prior routing techniques, the worst-case delay is exponential with respect to the number of routers in the sequence, whereas the delay for the presently described system is a polynomial proportional to $n^2$.

As will be appreciated, in accordance with embodiments of the present invention, global fairness throughout the network system 10 is achieved without necessitating the exchange of network information among the routers. In other words, each router acts on information that is purely local to that router, without using routing information passed from other routers in the network system 10. Advantageously, in accordance with embodiments of the present invention each router acts completely independently, based only on the state that it keeps and the packets that it routes, without having to implement additional communication or direction from a global resource.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of arbitrating data packets in a network system comprising:
   receiving one or more data packets at a network switching device, wherein each of the one or more data packets comprises a respective source identification;
   comparing each of the respective source identifications to a source identification history mechanism;
   routing each of the one or more data packets to an output, wherein a routing order is determined based on the comparison; and
   storing the respective source identification for each of the one or more data packets in the source identification history mechanism.

2. The method of claim 1, wherein receiving comprises receiving the one or more data packets at a router.

3. The method of claim 1, wherein comparing comprises comparing each of the respective source identifications to entries in a least recently used (LRU) queue.

4. The method of claim 1, wherein comparing comprises comparing each of the respective source identifications to entries in a cache.

5. The method of claim 1, wherein routing comprises routing each of the one or more data packets to the output, wherein the routing order comprises routing the one or more data packets in an order from a least recently routed source identification to a most recently routed source identification.

6. The method of claim 1, comprising weighting at least one of the one or more data packets to affect a storage location of the respective source identification in the identification history mechanism.

7. The method of claim 1, comprising storing a monotonically incremented time value for each of the one or more data packets in the identification history mechanism after routing the corresponding data packet.

8. The method of claim 7, comprising weighting at least one of the one or more data packets to affect the monotonically incremented time value stored in the identification history mechanism.

9. A method of arbitrating data packets in a network system comprising:
   tracking a source identification history corresponding to data packets routed by each of a plurality of network switching devices, wherein each of the network switching devices is configured to receive the data packets from a plurality of sources, wherein each data packet comprises a source identification corresponding to each data packet's respective source;
   routing the data packets in an order determined by the source identification history if one or more source identifications of the data packets are stored in the source identification history; and
   routing the data packets in a round-robin order if none of the source identifications of the data packets are stored in the source identification history.

10. The method of claim 9, wherein tracking comprises tracking the source identification history in each of a plurality of routers.

11. The method of claim 9, wherein tracking the source identification history comprises storing a respective source identification in a queue for each of the data packets routed by the plurality of network switching devices.

12. The method of claim 11, comprising weighting at least one of the data packets to affect a storage location of the corresponding source identification in the queue.

13. The method of claim 9, wherein tracking the source identification history comprises storing a monotonically incremented time value in a cache for each of the data packets routed by the plurality of network switching devices.

14. The method of claim 13, comprising weighting at least one of the data packets to affect the monotonically incremented time value stored in the cache.

15. The method of claim 9, wherein routing comprises routing the data packets, wherein the order comprises routing the data packets in an order from a least recently routed source identification to a most recently routed source identification.

16. A networked system comprising:
   a plurality of sources; and
   a plurality of switching devices coupled to the plurality of sources, wherein each of the plurality of switching devices is configured to route data packets among the plurality of sources and wherein each of the plurality of switching devices comprises a source identification history mechanism configured to track a history of data packets routed by the switching device, wherein each data packet comprises a source identification corresponding to each data packet's respective source;
   wherein each of the plurality of switches is configured to route the data packets in an order determined by the source identification history of one or more source identifications of the data packets stored in the source identification history and to route the data packets in a round-robin order if none of the source identifications of the data packets are stored in the source identification history.

17. The networked system of claim 16, wherein the plurality of sources comprises at least one of processors and I/O devices.

18. The networked system of claim 16, wherein the plurality of switching devices comprises routers.

19. The networked system of claim 16, wherein the source identification history mechanism comprises a queue.

20. The networked system of claim 16, wherein the source identification history mechanism comprises a cache.

21. A switching device comprising:
   a plurality of inputs, wherein each of the plurality of inputs is configured to receive data packets from at least one respective source;
   a source identification history mechanism configured to track source identification history corresponding to the data packets; and
   at least one output configured to facilitate delivery of the data packets to a destination;
   the switching device is configured to route data packets to the at least one output in an order based on the source identification history corresponding to the data packets.

22. The switching device of claim 21, wherein the plurality of inputs is configured to receive data packets from at least one of a plurality of processors and a plurality of I/O devices.

23. The switching device of claim 21, wherein the source identification history mechanism comprises a queue configured to store a respective source identification corresponding to each of the data packets.

24. The switching device of claim 21, wherein the source identification history mechanism comprises a cache configured to store a time stamp corresponding to each of the data packets.

25. The switching device of claim 21, wherein the switching device is configurable to process a weighted value provided in a field of the data packets, wherein the weighted value is storable in the source identification history mechanism and configured to affect routing of the data packets.

26. A method of arbitrating data packet routing comprising:
   receiving a first data packet from a first source at a first input of a switching device, wherein the first data packet comprises a first source identification corresponding to the first source;
   receiving a second data packet from a second source at a second input of the switching device, wherein the second data packet comprises a second source identification corresponding to the second source;
   comparing each of the first source identification and the second source identification with a source identification history mechanism; and
   routing each of the first data packet and the second data packet in an order determined based on the comparison,
   wherein comparing comprises:
   determining whether each of the first and second source identifications is stored in the source identification history mechanism;
   if each of the first and second source identifications is stored in the source identification history mechanism, routing comprises routing the data packet having a source identification that was least recently routed by the switching device prior to the receiving of the first and second data packets;
   if only one of the first and second source identifications is stored in the source identification history mechanism, routing comprises routing the one of the first and second source identifications that is not stored in the source identification history mechanism before routing the one of the first and second source identifications that is stored in the source identification mechanism; and
   if none of the first and second source identifications is stored in the source identification history mechanism, routing comprises routing each of the first and second data packets in a round-robin order.

27. The method of claim 26, wherein comparing comprises comparing each of the first source identification and the second source identification with entries in a least recently used (LRU) queue.

28. The method of claim 26, wherein comparing comprises comparing each of the first source identification and the second source identification with entries in a cache.

29. The method of claim 26, wherein routing comprises routing the data packet having a source identification that was least recently routed by the switching device prior to the receiving of the first and second data packets.

30. A method comprising:
   receiving a plurality of data packets at a network switching device, each of the plurality of data packets comprises a respective source identification;
   routing the plurality of data packets to an output port in an order determined based on the respective source identifications and a source identification history; and
   storing the respective source identification for each of the plurality of data packets in the source identification history.

* * * * *